March 13, 1934.   J. KLEFFMAN   1,951,296
CHOKER TRAP
Filed June 16, 1932
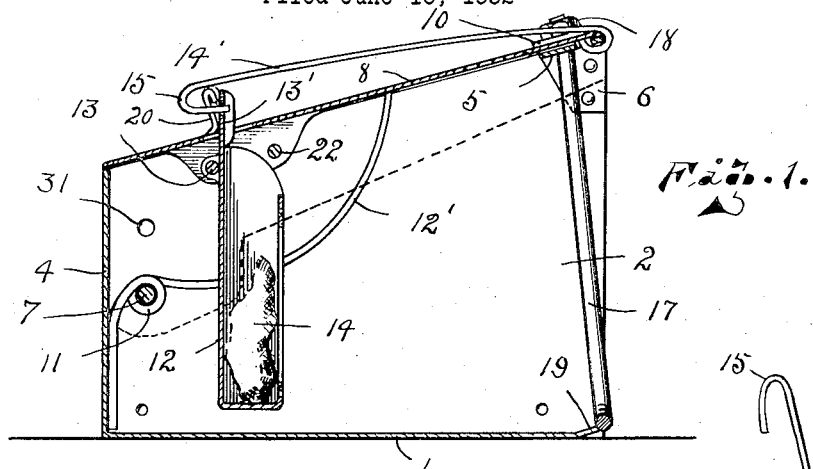
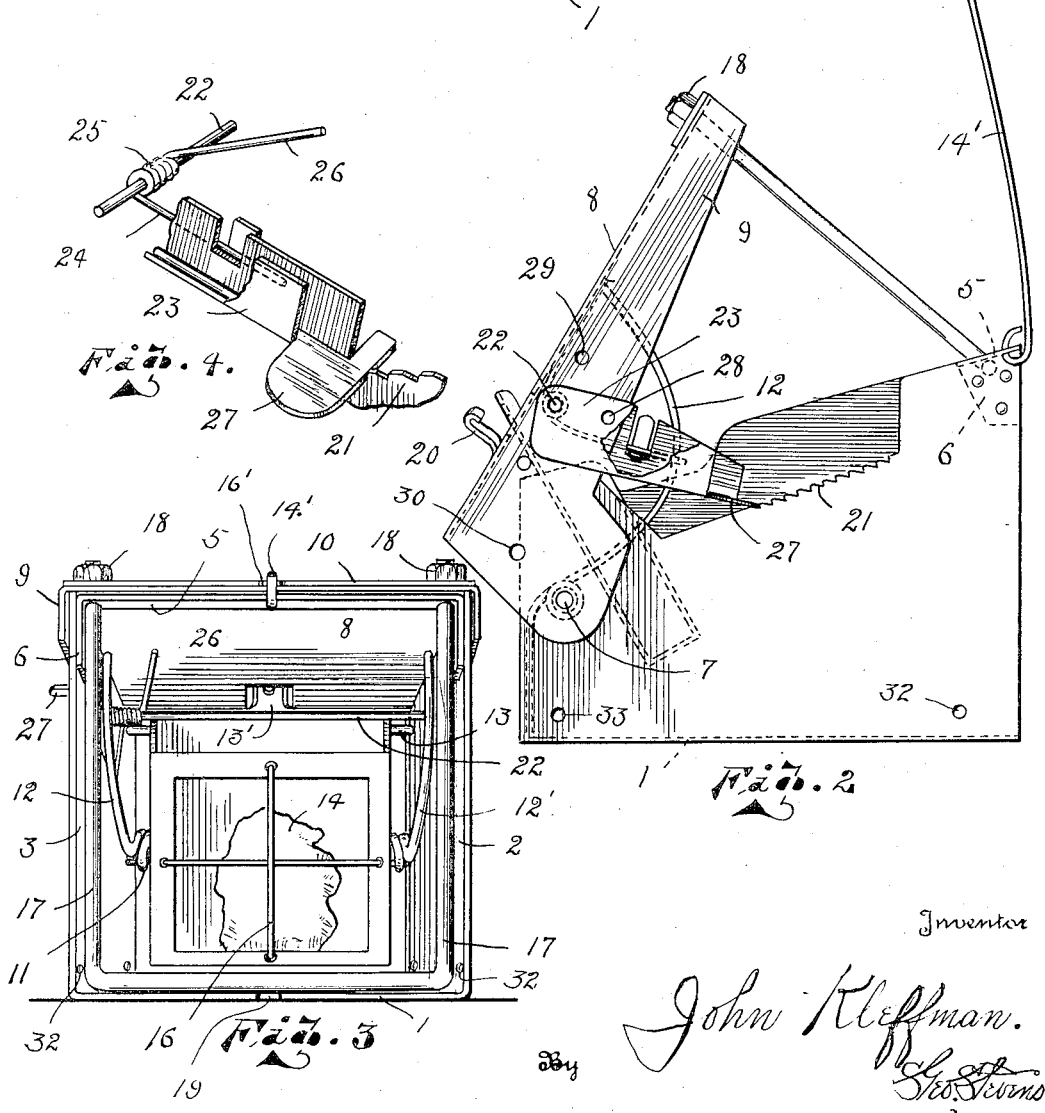
Inventor
John Kleffman.
By Geo Stevens
Attorney Patented Mar. 13, 1934

1,951,296

UNITED STATES PATENT OFFICE 1,951,296

CHOKER TRAP

John Kleffman, Hibbing, Minn.

Application June 16, 1932, Serial No. 617,518

2 Claims. (Cl. 43—85)

This invention relates to animal traps and has special reference to that type commonly known as choker traps, or strangler traps; the principal object being to provide a more practical device of this character.

Another object is to provide means whereby the trap is firmly locked in its sprung position irrespective of the size of the animal caught, this being not only to insure against escape of the animal but to as quickly as possible kill same as the trap is progressively locked as the choking of the animal increases.

A further object is to provide convenient means whereby to lock the trap in closed position for transportation purposes.

In the drawing:

Figure 1 is a vertical central section through one of the improved traps in its set position;

Figure 2 is a side elevation of Figure 1 showing the trap in its sprung position;

Figure 3 is a front elevation of Figure 1; and

Figure 4 is an enlarged perspective view of the automatic locking arrangement.

The body portion of the trap comprises the bottom 1, side members 2 and 3, and back 4, and is preferably composed of a unitary piece of sheet metal the upper free corners of the side members 2 and 3 being united as by the cross bar 5 which is bent downwardly at its ends as at 6 and securely united to the side members. These side members converge rearwardly as well as being less in height at their rearmost end, and the back 4 is materially smaller in size than the front of the trap, resulting in a forwardly and outwardly flared body portion.

Adjacent the back of the trap is the transverse shaft 7, forming the pivotal support for the cover of the trap which latter comprises the top member 8 and the right angularly shaped side members 9, the forward marginal edge of this cover being reinforced as by the cross bar 10 which is similar in size and shape to the cross bar 5 in the body of the trap. This shaft 7 not only acts as the pivotal support for the cover but also carries the two main springs of the trap, they being indicated at 11 and each terminates in an upwardly arched terminus 12' the free end of which impinges against the under face of the cover and the opposite ends against the back of the trap, and are so mounted and wound as to strongly urge the cover to its sprung position. These two springs tend to uniformly balance the trap as well as its action, which is particularly desirable in such a trap.

The bait carrying trigger of the trap is illustrated at 12 and pivotally mounted upon the transverse shaft 13 which is journalled within the side walls 9 of the cover, and is preferably provided with an open window-like face through which the bait as illustrated at 14 may be readily seen. The trigger is open at its upper end which provides convenience in applying the bait thereto, and the central finger 13' thereof extends upwardly through a suitable opening in the cover for application to the holding bar 14'. This latter bar is pivotally mounted within a suitable hole in the bar 5 and hooked backwardly as at 15 for engagement within the hole in the finger 13' of the trigger, thus providing means whereby a pushing action of the trigger by an animal trying to get at the bait will suffice to spring the trap, in preference to the action of the animal in pulling the bait to it, and the bait is preferably held within the trigger by means of suitable cross bars or wires indicated at 16, or other fine mesh wire may be used, if desired.

A central notch 16' is made in the forward edge of the bar 10 on the cover for centralization of the holding bar 14' when it is brought over against the cover to hold it in set position, and through the ends of the bar 10 are loosely mounted the upper extremities of the U-shaped choking bar or rod 17 which is slightly smaller than the inner open face of the trap so that it readily suspends thereinto, leaving a free and open space for the head of an animal. A nut 18 is applied to each end of the choker bar on top of the bar 10 to prevent its dislodgment. Furthermore a small clip 19 is struck up centrally of the front end of the body portion of the trap to make a convenient stop to the lower free end of the choke bar when set to prevent its being pushed inwardly as by the shoulders of an animal entering the trap, and to insure against binding during its upward travel.

On the upper surface of the cover and not far remote from where the trigger protrudes, I have shown an upstanding hook-like member 20, being preferably struck up from the metal of which the cover is composed, and under which the free end of the trip bar 14 may be hooked as a safety device during the process of or prior to the setting of the trap.

Now the automatic locking of the trap comprises cutting away a portion of the side 3 of the trap and providing upon the inclined upper edge thereof a series of notches as at 21 and installing upon the transverse shaft 22 which is journalled in the side walls of the cover the trough like dog member 23; this being of trough like form to insure its direct action upon the saw-like edge of the side wall of the trap, and furthermore to give it added strength and provide suitable means for reception of one end 24 of the spring 25, while the opposite end 26 impinges against the under side of the cover, thus positively biasing the dog 23 to its engaged position with the rack 21. One wall of the free end of the dog is bent downwardly forming a convenient thumb and finger grip 27 extending laterally from the side of the trap so that when not desired, or during the process of removal of an animal from the trap, the dog may be raised until the hole 28 in the side wall thereof registers with a like hole 29 in the side wall of the cover upon which the dog is mounted, when a nail or similar object may be thrust into said registering holes and thus insure the dog from being active. It is to be noted that similar means for holding the cover in its closed position is resorted to by it being provided with holes 30 for registration with the holes 31 in the sides of the trap through which a nail or wire may be inserted when they register and hold the trap in closed position, for example during the shipping of same, or the like.

It will also be understood that a sufficient number of holes are provided in the bottom of the trap as well as in the sides thereof as at 32 and 33 for the insertion of wire or other flexible element for attaching the trap to for example a log or for suspending the same from the trunk of a tree, as it is to be understood that this trap functions admirably when suspended, and this might prevent creatures, (other than those intended to be caught) from entering same.

I claim:

1. A trap of the type described comprising a flared box-like body portion having an open front and top, a cover member pivotally mounted adjacent the smaller end of the body portion, spring means urging said cover to its open position, a choker bar attached to the free end of the cover and reciprocal adjacent the open end of the body portion, a bait carrying trigger pivotally carried by the cover for cooperative holding or releasing thereof, and a holding bar for setting the trap.

2. The combination with a choker trap of the type described including a stationary portion and a spring actuated portion between which portions the animal is caught, of a spring actuated dog attached to one portion and engageable with the other for holding the trap in any sprung position, and means whereby said dog may be locked in inactive position.

JOHN KLEFFMAN.